United States Patent
Muramoto (10) Patent No.: US 8,842,304 B2
(45) Date of Patent: Sep. 23, 2014

(54) IMAGE PROCESSING APPARATUS, IMAGE PROCESSING CIRCUIT, AND METHOD OF CONTROLLING IMAGE PROCESSING APPARATUS

(71) Applicant: Yohsuke Muramoto, Kanagawa (JP)

(72) Inventor: Yohsuke Muramoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 81 days.

(21) Appl. No.: 13/714,791

(22) Filed: Dec. 14, 2012

(65) Prior Publication Data

US 2013/0155437 A1 Jun. 20, 2013

(30) Foreign Application Priority Data

Dec. 16, 2011 (JP) ................................. 2011-275855

(51) Int. Cl.
*H04N 1/00* (2006.01)
(52) U.S. Cl.
CPC .... *H04N 1/00933* (2013.01); *H04N 2201/0094* (2013.01)
USPC ...................... 358/1.13; 358/426.03; 358/468
(58) Field of Classification Search
USPC ............. 358/400, 468, 1.9, 401, 426.03, 501, 358/1.13
See application file for complete search history.

(56) References Cited

U.S. PATENT DOCUMENTS

| 5,933,580 A * | 8/1999 | Uda et al. ...................... 358/1.13 |
| 6,177,934 B1 * | 1/2001 | Sugiura et al. ................ 715/748 |
| 2010/0188574 A1 * | 7/2010 | Hung et al. .................... 348/500 |
| 2011/0129244 A1 * | 6/2011 | Shoji et al. ....................... 399/51 |

FOREIGN PATENT DOCUMENTS

| JP | 405252327 | * 9/1993 | ............... H04N 1/00 |
| JP | 2009-145738 | 7/2009 | |

* cited by examiner

*Primary Examiner* — Jerome Grant, II
(74) *Attorney, Agent, or Firm* — Oblon, Spivak, McClelland, Maier & Neustadt, L.L.P.

(57) ABSTRACT

Disclosed is an image processing apparatus including a reading unit that reads a document, an image forming and outputting unit that performs an image forming and outputting process, a read image transfer circuit that processes and transfers read image information so as to input the read image information to a controller of the image processing apparatus, an output image transfer circuit that processes and transfers output image information so as to input the output image information to the image forming and outputting unit, and a clock oscillator that generates clocks to be supplied to the read image transfer circuit and the output image transfer circuit, wherein the clock oscillator individually alters clock supply states for supplying the clocks to the read image transfer circuit and to the output image transfer circuit, depending on an operating mode of the image processing apparatus.

8 Claims, 5 Drawing Sheets

| OPERATING CONDITION | S2M CLOCKS | M2P CLOCKS |
|---|---|---|
| S2M PATH STAND ALONE OPERATION | REQUIRED CLOCKS | LOW-SPEED CLOCKS |
| M2P PATH STAND ALONE OPERATION | LOW-SPEED CLOCKS | REQUIRED CLOCKS |
| STANDBY MODE | LOW-SPEED CLOCKS | LOW-SPEED CLOCKS |
| SLEEP MODE | TERMINATE CLOCKS | TERMINATE CLOCKS |
| DOUBLE PATH OPERATION | REQUIRED CLOCKS | REQUIRED CLOCKS |
| ... | | |

IMAGE PROCESSING APPARATUS, IMAGE PROCESSING CIRCUIT, AND METHOD OF CONTROLLING IMAGE PROCESSING APPARATUS

BACKGROUND OF THE INVENTION

1. Field of the Invention

An embodiment of the present invention relates to an image processing apparatus, an image processing circuit, and a method of controlling the image processing apparatus. Especially, the embodiment of the present invention relates to clock supply control during an energy saving mode.

2. Description of the Related Art

Recently, digitization of information has been promoted and thus image processing apparatuses are inevitable. The image processing apparatuses include, for example, a printer that is used for outputting digitized information and a scanner that is used for performing facsimile communication and for digitizing documents. In many cases, such an image processing apparatus is formed as a multifunction peripheral that can be used as a printer, a facsimile machine, a scanner, and a copier. Namely, the image processing apparatus includes an imaging function, an image forming function, and a communication function.

In such an image processing apparatus, an application specific integrated circuit (ASIC) processes read data input from the scanner and processes image data to be input to a plotter that performs image formation and outputs the formed image. The ASIC performs the above described processing by operating in accordance with clocks supplied from a clock generating unit.

Further, there is an image processing apparatus in which an operating mode may be switched to an energy saving mode where the power consumption is reduced. The operating mode is switched to the energy saving mode by shutting off the power supply to a portion of the apparatus. In such an energy saving mode, the clock generating unit turns off the clock supply, thereby improving the energy saving effect (e.g., cf. Patent Document 1 (Japanese Patent Laid-Open Application No. 2009-145738)).

In the image processing apparatus that is formed as the multifunction peripheral, an image processing unit (IPU) board may be employed. The IPU board is an ASIC that has a function to process the read data from the scanner and a function to process the image data to be input to the plotter.

As for this IPU board, clock supply to the IPU board is preferably turned off during the energy saving mode, so as to improve the energy saving effect. However, power-saving control according to conventional clock control is for a state where an image processing apparatus is not operating, such as the energy saving mode or a standby mode.

In the image processing apparatus including the IPU board, for example, during scanning operation, a function to process read data input from the scanner is operating while a function to process image data to be input to the plotter is not operating. However, the clocks are supplied to all modules included in the IPU board. Therefore, there is a problem such that unnecessary clocks are supplied to some modules, and thereby the power consumption is wasted.

SUMMARY OF THE INVENTION

The embodiment of the present invention has been developed while considering the above-described circumstances. An objective of the embodiment of the present invention is to improve an energy saving effect in an image processing apparatus including an image reading function and an image outputting function.

In one aspect, there is provided an image processing apparatus including a reading unit configured to read a document and an image forming and outputting unit configured to perform an image forming and outputting process, the image processing apparatus comprising:

a read image transfer circuit configured to process read image information that has been read and generated by the reading unit and configured to transfer the read image information, so as to input the read image information to a controller configured to control the image processing apparatus;

an output image transfer circuit configured to process output image information that has been transferred from the controller and configured to transfer the output image information, so as to input the output image information to the image forming and outputting unit, wherein the image forming and outputting unit is to apply the image forming and outputting process to the output image information; and a clock oscillator configured to generate first clocks to be supplied to the read image transfer circuit and second clocks to be supplied to the output image transfer circuit, wherein the clock oscillator is configured to individually alter a first clock supply state for supplying the first clocks to the read image transfer circuit and a second clock supply state for supplying the second clocks to the output image transfer circuit, depending on an operating mode of the image processing apparatus.

In another aspect, there is provided an image processing circuit for an image processing apparatus including a reading unit configured to read a document and an image forming and outputting unit configured to perform an image forming and outputting process, the image processing circuit being configured to connect the reading unit and the image forming and outputting unit to a controller of the image processing unit, the image processing circuit comprising:

a read image transfer circuit configured to process read image information that has been read and generated by the reading unit and configured to transfer the read image information, so as to input the read image information to the controller;

an output image transfer circuit configured to process output image information that has been transferred from the controller and configured to transfer the output image information, so as to input the output image information to the image forming and outputting unit, wherein the image forming and outputting unit is to apply the image forming and outputting process to the output image information; and a clock oscillator configured to generate first clocks to be supplied to the read image transfer circuit and second clocks to be supplied to the output image transfer circuit, wherein the clock oscillator is configured to individually alter a first clock supply state for supplying the first clocks to the read image transfer circuit and a second clock supply state for supplying the second clocks to the output image transfer circuit, depending on an operating mode of the image processing apparatus.

In another aspect, there is provided a method of controlling an image processing apparatus including a reading unit configured to read a document and an image forming and outputting unit configured to perform an image forming and outputting process, wherein the image processing apparatus includes a read image transfer circuit configured to process read image information that has been read and generated by the reading unit and configured to transfer the read image information, so as to input the read image information to a controller of the image processing apparatus;

an output image transfer circuit configured to process output image information that has been transferred from the controller and configured to transfer the output image information, so as to input the output image information to the image forming and outputting unit, wherein the image forming and outputting unit is to apply the image forming and outputting process to the output image information; and a clock oscillator configured to generate first clocks to be supplied to the read image transfer circuit and second clocks to be supplied to the output image transfer circuit, wherein the method of controlling comprises:

a step of detecting a change in an operating mode of the image processing apparatus; and a step of individually altering a first clock supply state for supplying the first clocks to the read image transfer circuit and a second clock supply state for supplying the second clocks to the output image transfer circuit, depending on the detected operating mode of the image processing apparatus.

According to the embodiment of the present invention, the energy saving effect can be improved in the image processing device including the image reading unit and the image forming and outputting unit.

Other objects, features and advantages of the present invention will become more apparent from the following detailed description when read in conjunction with the accompanying drawings.

DETAILED DESCRIPTION OF THE PREFERRED EMBODIMENTS

Hereinafter, an embodiment of the present invention will be explained by referring to the accompanying drawings. In the embodiment, a multifunction peripheral (MFP) will be explained as an example of an image processing apparatus.

Figure 1:
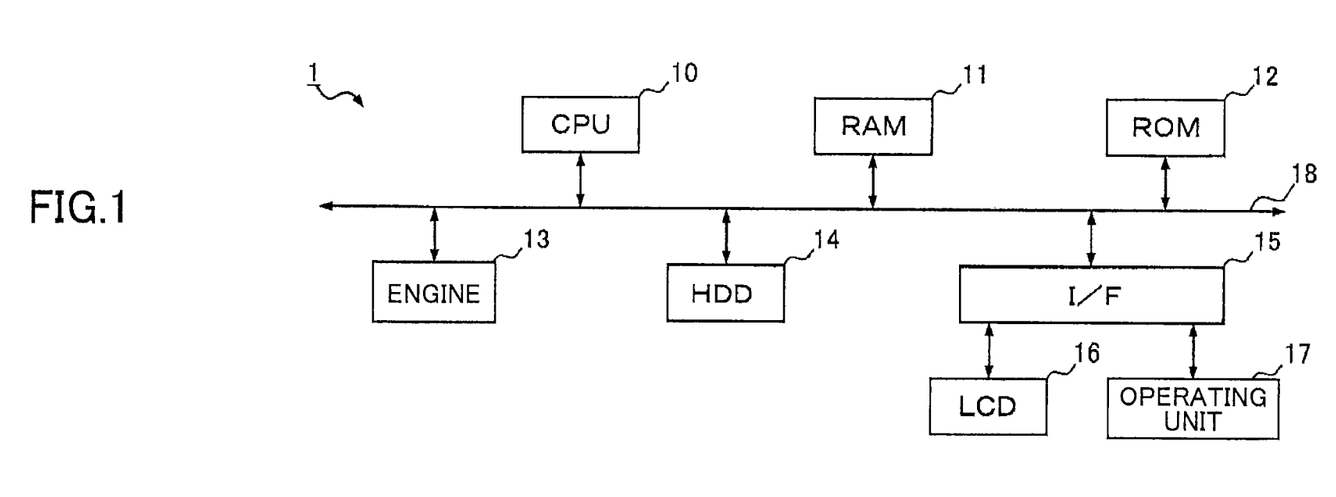
FIG. 1 is a block diagram showing a hardware configuration of an image processing apparatus according to an embodiment of the present invention.

FIG. 1 is a block diagram showing a hardware configuration of an image processing apparatus 1 according to the embodiment. As shown in FIG. 1, the image processing apparatus 1 according to the embodiment has an engine 13 for performing image formation, in addition to a configuration similar to that of an information processing terminal such as a usual server or a personal computer (PC). Namely, the image processing apparatus 1 according to the embodiment includes a central processing unit (CPU) 10; a random access memory (RAM) 11; a read only memory (ROM) 12; the engine 13; a hard disk drive (HDD) 14, and an I/F 15, which are connected through a bus 18. Further, a liquid crystal display (LCD) 16 and an operating unit 17 are connected to the I/F 15.

The CPU 10 is a processing unit, and the CPU 10 controls the entire operations of the image processing apparatus 1. The RAM 11 is a volatile storage medium. Information can be written in the RAM 11 at high speed, and information stored in the RAM 11 can be read at high speed. The RAM 11 is utilized as a working area for the CPU 11 to process information. The ROM 12 is a non-volatile read-only storage medium. The ROM 12 stores programs such as firmware. The engine 13 is a device that actually performs an image forming process in the image processing apparatus 1.

The HDD 14 is a non-volatile storage medium. Information can be written in the HDD 14, and information can be read out from the HDD 14. The HDD 14 stores various types of control programs, such as an operating system (OS) and application programs. The I/F 15 connects various types of hardware and networks to the bus 18. The I/F 15 controls the various types of hardware, the networks, and the bus 18. The LCD 16 is a visual user interface for a user to confirm a mode of the image processing apparatus 1. The operating unit 17 is a user interface for the user to input information to the image processing apparatus 1, such as a keyboard or a mouse.

In such a hardware configuration, a program stored in a recording medium such as the ROM 12, the HDD 14, or an optical disk (not shown) is read out to the RAM 11, and the CPU 10 executes operations according to the program, thereby forming a software control unit. A combination of the thus formed software control unit and the hardware forms functional blocks that realize the functions of the image processing apparatus 1 according to the embodiment.

Figure 2:
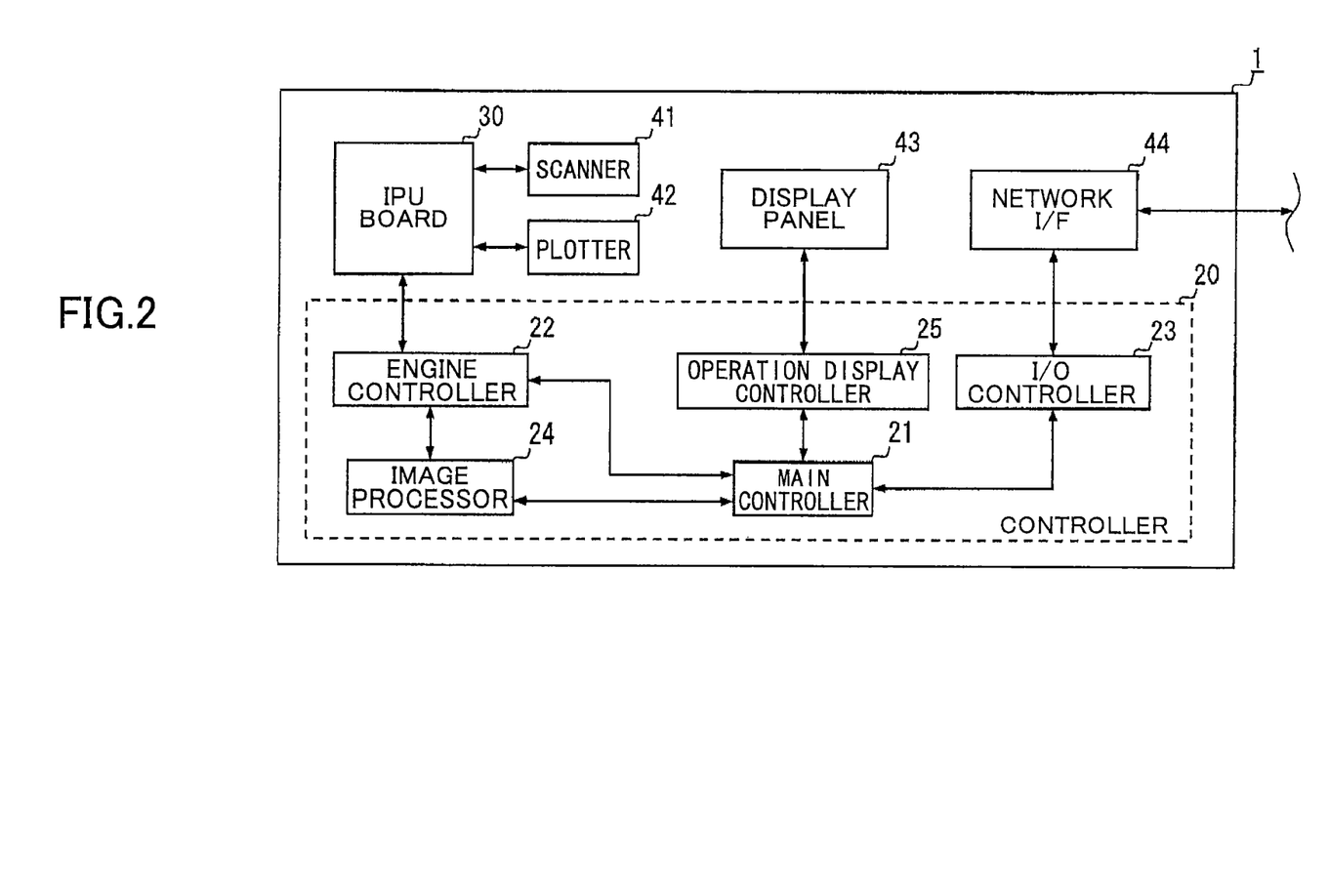
FIG. 2 is a diagram showing a functional configuration of the image processing apparatus according to the embodiment.

Next, there will be explained a functional configuration of the image processing apparatus 1 according to the embodiment by referring to FIG. 2. FIG. 2 is a block diagram showing a functional configuration of the image processing apparatus 1 according to the embodiment. As shown in FIG. 2, the image processing apparatus 1 according to the embodiment includes a controller 20; an image processing unit (IPU) board 30; a scanner 41; a plotter 42; a display panel 43; and a network I/F 44.

Further, the controller 20 includes a main controller 21; an engine controller 22; an I/O controller 23; an image processor 24; and an operation display controller 25. As shown in FIG. 2, the image processing apparatus 1 according to the embodiment is formed as the multifunction peripheral including the scanner 41 and the plotter 42.

The display panel 43 is an output interface that visually indicates a mode of the image processing apparatus 1 and, at the same time, the display panel 43 is an input interface (operating unit), which is a touch panel for the user to directly control the image processing apparatus 1 or to directly input information to the image processing apparatus 1. The network I/F 44 is an interface for the image processing apparatus 1 to communicate with another device through a network. For example, Ethernet (registered trademark) or a universal serial bus (USB) interface is utilized.

The controller 20 is formed by a combination of the hardware and the software. Specifically, the controller 20 is formed by the software control unit and the hardware such as an integrated circuit. Here, the software control unit is realized in accordance with the control of the CPU 10 when the control program (which control program is stored in the non-volatile memory such as the ROM 12, the HDD 14, or the optical disk) is downloaded into a volatile memory (hereinafter, referred to as "the memory") such as the RAM 11. The controller 20 functions as a controller that controls the entire image processing apparatus 1.

The main controller 21 controls the engine controller 22, the I/O controller 23, the image processor 24, and the operation display controller 25. The main controller 21 provides instructions to the engine controller 22, the I/O controller 23, the image processor 24, and the operation display controller 25. The engine controller 22 functions as a driving unit for controlling and driving the scanner 41 and the plotter 42 through controlling the IPU board 30. The I/O controller 23 inputs a signal and an instruction which are input through the network I/F 44 to the main controller 23. Further, the main controller 21 controls the I/O controller 23, and thereby the main controller 21 accesses another device through the network I/F 44.

The image processor 24 generates drawing information based on print information included in a print job that has been input to the image processing apparatus 1, in accordance with the control of the main controller 21. The drawing information is output image information for the plotter 42 to draw an image to be formed during an image forming operation. The print information included in the print job is image information that has been transformed by a printer driver installed in an information processing device such as a PC into a format that can be recognized by the image processing apparatus 1. The operation display controller 25 indicates information on the display panel 43. The operation display controller 25 reports information that has been input through the display panel 43 to the main controller 21.

When the image processing device operates as a printer, first, the I/O controller 23 receives the print job through the network I/F 44. The I/O controller 23 transfers the received print job to the main controller 21. When the main controller 21 receives the print job, the main controller controls the image processor 24 and causes the image processor 24 to generate the drawing information based on the print information included in the print job.

When the drawing information has been generated by the image processor 24, the engine controller 22 transfers the generated drawing information to the IPU board 30, and the engine controller 22 causes the plotter 42 to form an image on a sheet that is to be conveyed. Namely, the plotter 42 functions as an image forming and outputting unit.

When the image processing apparatus 1 operates as a scanner, the operation display controller 25 or the I/O controller 23 transfers a scan execution signal to the main controller 21, in response to an operation that has been input by the user through the display panel 43 or a scan execution instruction that has been input from an external information processing terminal through the network I/F 44. The main controller 21 controls the engine controller 22 based on the received scan execution signal.

The engine controller 22 drives the scanner 41 by controlling the IPU board 30, and thereby the scanner 41 scans a document that has been set on an auto document feeder (ADF) of the scanner 41 or on a contact glass of the scanner 41. Namely, the scanner 41 operates as a reading unit for reading the document.

In a photographing process, an image sensor included in the scanner 41 such as a charge coupled device (CCD) receives optical information of the scanned document, thereby generating the read image information based on the optical information. The engine controller 22 transfers the read image information, which has been photographed by the scanner 41 and which has been input to the engine controller 22 through processing by the IPU board 30, to the image processor 24. In accordance with the control of the main controller 21, the image processor 24 generates image information to be stored as a scanning result, based on the read image information received from the engine controller 22. The image information generated by the image processor 24 is stored in a recording medium which is attached to the image processing apparatus 1, such as the HDD 40.

The image information that has been generated by the image processor 24 is stored in the HDD 40 in accordance with an instruction from the user, or the image information is transmitted outside the image processing apparatus 1 through the I/O unit 23 and the network I/F 44. Namely, the scanner 41, the IPU board 30, and the engine controller 22 function as an image input unit.

Further, when the image processing apparatus 1 operates as a copier, the image processor 24 generates the drawing information based on the read image information received by the engine controller 22 from the scanner through the IPU board 30, or based on the image information generated by the image processor 24. Similar to the case where the image processing apparatus 1 operates as a printer based on the drawing information, the engine controller 22 drives the plotter 42 by controlling the IPU board 30.

Figure 3:
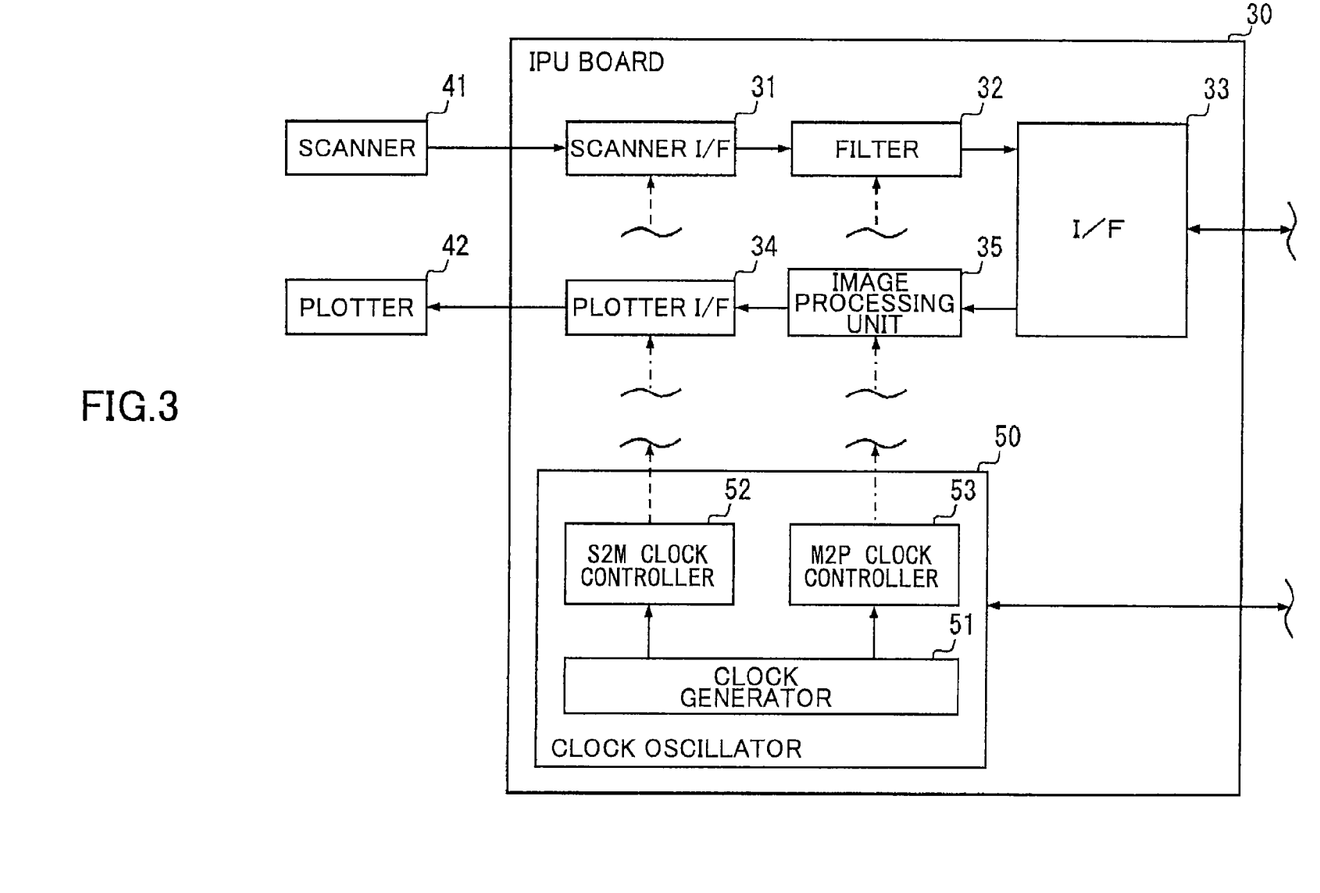
FIG. 3 is a diagram showing a configuration of an IPU board according to the embodiment.

Next, there will be explained the configuration of the IPU board 30 according to the embodiment by referring to FIG. 3. As shown in FIG. 3, the IPU board 30 according to the embodiment includes a scanner I/F 31; a filter 32; an I/F 33; a plotter I/F 34; an image processing unit 35; and a clock oscillator 50. Further, the clock oscillator 50 includes a clock generator 51; a Scan to Memory (S2M) clock controller 52; and a Memory to Plotter (M2P) clock controller 53.

The scanner I/F 31 is an interface through which a signal to the scanner 41 is transmitted and a signal from the scanner 41 is received. The scanner I/F 31 obtains the read image information generated by the photographing operation by the scanner 41, and the scanner I/F 31 transmits the generated read image information to the filter 32 in accordance with clocks supplied from the clock oscillator 50. The filter 32 applies required image processing to the read image information that has been transferred in accordance with the clocks from the scanner I/F 31, and the filter 32 transfers the processed read image information to the I/F 33. Namely, the filter 32 operates as a read image transfer circuit.

The I/F 33 transfers the read image information that has been transferred from the filter 32 to the engine controller 22 of the controller 20. Further, the I/F 33 transfers the drawing information that has been input from the engine controller 22 to the image processing unit 35 in accordance with the clocks.

The image processing unit 35 applies required image processing to the drawing information that has been transferred from the I/F 33, thereby generating pixel information for the plotter 42 to perform an image forming and outputting process for each of pixels forming an image to be output. The image processing unit 35 transfers the generated pixel information to the plotter I/F 34. Namely, the image processing unit 35 operates as an output image transfer circuit. The plotter I/F 34 transfers the pixel information that has been transferred from the image processing unit 35 to the plotter 42, thereby causing the plotter 42 to perform the image forming and outputting process.

The clock oscillator 50 supplies the clocks to corresponding modules included in the IPU board 30. At the same time, the clock oscillator 50 switches the supplies of the clocks to the corresponding modules included in the IPU board 30 in accordance with the control of the engine controller 22.

The clock oscillator 50 performs the switching of the clocks in accordance with the control of the engine controller 22. Specifically, the CPU 10 that operates as the engine controller 22 controls the clock oscillator 50 based on register settings. Here, the CPU 10 operates as the engine controller 22 by performing the operations in accordance with the program that has been downloaded into the RAM 11.

The clock generator 51 generates and outputs reference clocks. The reference clocks are an origin of the clocks that are supplied to the corresponding modules of the IPU board 30. As indicated by the term "Scan to Memory," the S2M clock controller 52 controls the clocks (hereinafter, referred to as "S2M clocks") that are supplied to a data path from the scanner 41 to the RAM 11 (hereinafter, referred to as "S2M path"). Here, the RAM 11 is a portion of the engine controller 22.

Further, as indicated by the term "Memory to Plotter," the M2P clock controller 53 controls the clocks (hereinafter, referred to as "M2P clocks") that are supplied to a data path from the RAM 11, which is a portion of the engine controller 22, to the plotter 42 (hereinafter, referred to as "M2P path"). The S2M path is the data path that includes the scanner I/F 31 and the filter 32 shown in FIG. 3. The M2P path is the data path that includes the plotter I/F 34 and the image processing unit 35 shown in FIG. 3.

Hereinafter, details of the S2M clock controller 52 and the M2P clock controller 53 are explained by referring to FIG. 4.

Figure 4:
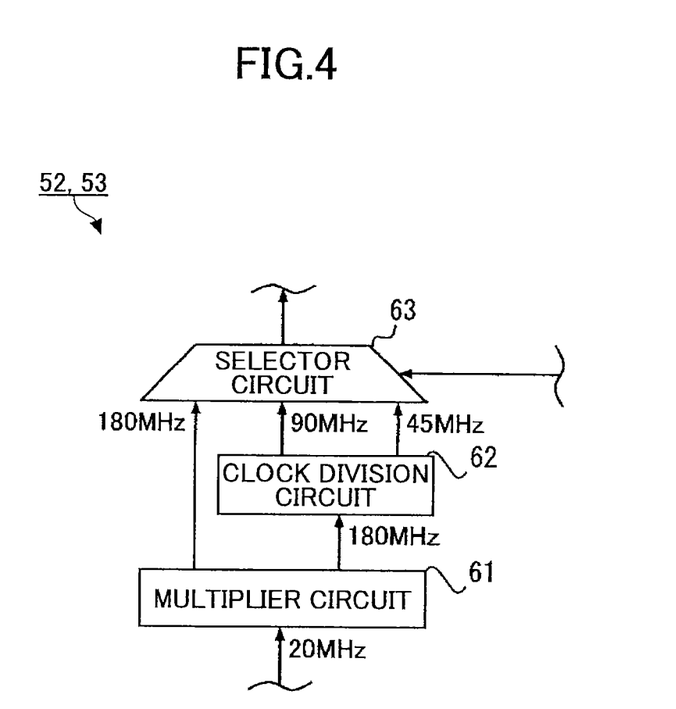
FIG. 4 is a diagram showing details of a clock controller according to the embodiment.

As shown in FIG. 4, the S2M clock controller 52 includes a multiplier circuit 61; a clock division circuit 62; and a selector circuit 63. Similarly, the M2P clock controller 53 includes a multiplier circuit 61; a clock division circuit 62; and a selector circuit 63. The clock generator 51 inputs the reference clocks to the multiplier circuit 61. As shown in FIG. 4, the reference clocks according to the embodiment have a frequency of 20 MHz. The multiplier circuit 61 multiplies the reference clocks and outputs clocks having a frequency of 180 MHz.

The multiplier circuit 61 inputs the clocks having the frequency of 180 MHz, which have been generated by multiplying the reference clocks, to the clock division circuit 62 and to the selector circuit 63. The clock division circuit 62 divides the clocks having the frequency of 180 MHz, which have been input from the multiplier circuit 61, and generates clocks having a frequency of 90 MHz and clocks having a frequency of 45 MHz. The clock division circuit 62 inputs the generated clocks having the frequency of 90 MHz and the generated clocks having the frequency of 45 MHz to the selector circuit 63.

The selector circuit 63 switches among the clocks of 180 MHz, the clocks of 90 MHz, and the clocks of 45 MHz, and outputs one of the clocks of 180 MHz, the clocks of 90 MHz, and the clocks of 45 MHz. The selector circuit 63 switches the clocks to be output in accordance with the register setting by the CPU 10, which operates as the engine controller 22 as described above.

In such a configuration, the engine controller 22 controls the clock oscillator 50 depending on an operating mode of the image processing apparatus 1, and thereby the engine controller 22 controls the supply of the S2M clocks and the supply of the M2P clocks. Hereinafter, there will be explained controlled states of the clock oscillator 50 by the engine controller 22 according to the embodiment.

Figure 5:
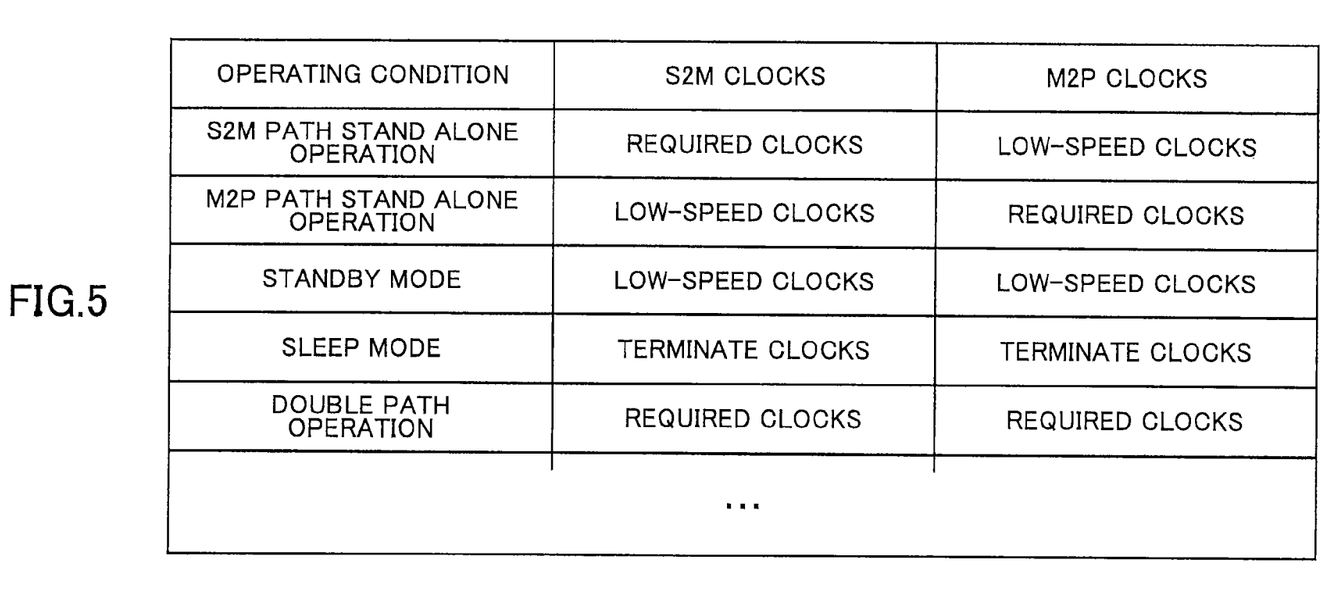
FIG. 5 is a diagram showing subjects to be controlled depending on a mode of the image processing device according to the embodiment.

FIG. 5 is a table indicating control modes of the engine controller 22 according to the embodiment. As shown in FIG. 5, the engine controller 22 according to the embodiment individually alters the S2M clocks and the M2P clocks depending on an "operating condition," which indicates an operating mode of the image processing apparatus 1.

For example, for a case of "S2M path stand-alone operation," the engine controller 22 controls the supply of the S2M clocks and the supply of the M2P clocks such that required clocks are supplied as the S2M clocks and low-speed clocks are supplied as the M2P clocks. Here, the case of "S2M path stand-alone operation" corresponds to a normal scanning process or a facsimile transmission process in the image processing apparatus 1 having a facsimile function, for example.

As explained by referring to FIG. 4, the S2M clock controller 52 and the M2P clock controller 53 according to the embodiment are capable of switching among the clocks of 180 MHz, the clocks of 90 MHz, and the clocks of 45 MHz, and outputting the corresponding one of the clocks of 180 MHz, the clocks of 90 MHz, and the clocks of 45 MHz. The clocks of 180 MHz or the clocks of 90 MHz are utilized as the required clocks depending on the operating mode. The clocks of 45 MHz are utilized as energy-saving clocks.

Similarly, for a case of "M2P path stand-alone operation," as shown in FIG. 5, the engine controller 22 controls the supply of the S2M clocks and the supply of the M2P clocks such that the low-speed clocks are supplied as the S2M clocks and the required clocks are supplied as the M2P clocks. The case of "M2P path stand-alone operation" corresponds to a normal print-out process or a facsimile receiving process in the image processing apparatus 1 having the facsimile function, for example.

A "standby mode" is a mode of the image processing apparatus 1 where there are no jobs, but the image processing apparatus 1 is able to operate immediately. The standby mode is the mode of the image processing apparatus 1 to which the operation mode of the image processing apparatus 1 transfers immediately after completion of the print-out process, the scanning process, or the copying process. In this case, the engine controller 22 controls the supply of the S2M clocks and the supply of the M2P clocks such that the energy-saving clocks are supplied as the S2M clocks and the energy-saving clocks are supplied as the M2P clocks.

A "sleep mode" is the so-called "energy saving mode." The sleep mode is a mode of the image processing apparatus 1 to which the operation mode of the image processing apparatus 1 transfers when there have been no processes in the image processing apparatus 1 for more than or equal to a predetermined time period, for example. In this case, the engine controller 22 controls not to supply the S2M clocks and the M2P clocks.

For a case where the supplies of the clocks are terminated, the engine controller 22 terminates the supplies of the clocks by causing the clock generator 51 to terminate inputting the reference clocks to the multiplier circuit 61, not by controlling the selector circuit 63. Namely, the multiplier circuit 61 is caused to terminate outputting the clocks. In this manner, the multiplier circuit 61 and the clock division circuit 62 are caused to stop operating, thereby improving the energy saving effect.

As a method of terminating the output from the multiplier circuit 61, a method may be considered where the multiplying operation is invalidated by the operational setting of the clock generator 51, in addition to the method where the clock generator 51 is caused to terminate outputting the reference clocks. Further, depending on a control scheme of the energy saving mode, the supply of the power to the CPU 10 and to the IPU board 30 may be terminated. In such a case, the supply of the clocks is terminated irrespective of the control of the engine controller 22.

In this manner, in the image processing apparatus 1 according to the embodiment, the engine controller 22 independently controls the supply of the S2M clocks to the S2M path and the supply of the M2P clocks to the M2P path, depending on the mode of the image processing apparatus 1. Specifically, for a case where only one of the S2M path and the M2P path operates, the clocks are supplied as usual to the one of the S2M path and the M2P path that operates, while the supply of the clocks to the other path is regulated.

Accordingly, it is possible to avoid an inefficient condition such as a case where the M2P clocks are supplied to the M2P path during the S2M path stand-alone operation (e.g., the scanning process or the facsimile transmission process) and a case where the S2M clocks are supplied to the S2M path during the M2P path stand-alone operation (e.g., the print-out process or the facsimile receiving process). Therefore, it is possible to reduce the power consumption.

In the above embodiment, as shown in FIG. 5, the case has been explained in which the power consumption is reduced by setting the M2P clocks to be the low-speed clocks in the S2M path stand-alone operation, while setting the S2M clocks to be the low-speed clocks in the M2P path stand-alone operation.

Here, taking into consideration a time interval required for the clock frequency to be stabilized subsequent to the restart of the supply of the clocks, the low-speed clocks are utilized instead of terminating the clocks as in the case of the sleep mode. Namely, when the supply of the reference clocks from the clock generator 51 is terminated, the multiplier circuit 61 and the clock division circuit 62 also stop operating. Subsequently, when the supply of the reference clocks is restarted, the multiplier circuit 61 restarts the multiplying operation and the clock division circuit 62 restarts the dividing operation. Therefore, it takes a certain amount of time to stabilize the operation so as to output the frequency in accordance with the setting.

The time interval for stabilizing the operation to output the frequency in accordance with the setting becomes longer as the clock speed becomes greater. For an apparatus that operates at high speed, such as an apparatus in which the high-speed clocks are utilized, timings for controlling devices are tight. Therefore, if the certain amount of time is required for stabilizing the clocks, it is possible that the operation of the apparatus is hindered.

On the other hand, when the selector circuit 63 switches among the clocks of 180 MHz, the clocks of 90 MHz, and the clocks of 45 MHz which are supplied to the selector circuit 63, since the state is maintained where the clocks of 180 MHz, the clocks of 90 MHz, and the clocks of 45 MHz are stably supplied, no time is required to stabilize the clock frequencies. Therefore, it is possible to avoid such hindrance of the operation of the apparatus.

On the other hand, for a case of a low-speed apparatus for which the timings for controlling devices are not so tight, it is possible to ensure the time for stabilizing the clocks. Therefore, further power reduction may be achieved by terminating the supply of the M2P clocks in the S2M path stand-alone operation and terminating the supply of the S2M clocks in the M2P path stand-alone operation.

In the above-described embodiment, the case has been explained in which the S2M clocks input to the scanner I/F 31 and the filter 32 are controlled as the clocks of the S2M path and the M2P clocks input to the plotter I/F 34 and the image processing unit 35 are controlled as the clocks of the M2P path, while clocks are always supplied to the I/F 33 as long as the power is supplied to the IPU board 30.

Alternatively, the I/F 33 may have a configuration such that the portion corresponding to the S2M path and the portion corresponding to the M2P path are divided. In this case, for the S2M path stand-alone operation, the supply of the S2M clocks and the supply of the M2P clocks may be controlled such that the required clocks are supplied as the S2M clocks, while the low-speed clocks are supplied as the M2P clocks or the supply of the M2P clocks is terminated. Similarly, for the M2P path stand-alone operation, the supply of the S2M clocks and the supply of the M2P clocks may be controlled such that the required clocks are supplied as the M2P clocks, while the low-speed clocks are supplied as the S2M clocks or the supply of the S2M clocks is terminated.

Hereinabove, the image processing apparatus, the image processing circuit, and the method of controlling the image processing apparatus have been explained by the embodiment. However, the present invention is not limited to the above-described embodiment, and various modifications and improvements may be made within the scope of the present invention.

The present application is based on Japanese Priority Application No. 2011-275855 filed on Dec. 16, 2011, the entire contents of which are hereby incorporated herein by reference.

What is claimed is:

1. An image processing apparatus including a reading unit configured to read a document and an image forming and outputting unit configured to perform an image forming and outputting process, the image processing apparatus comprising:
   a read image transfer circuit configured to process read image information that has been read and generated by the reading unit and configured to transfer the read image information, so as to input the read image information to a controller configured to control the image processing apparatus;
   an output image transfer circuit configured to process output image information that has been transferred from the controller and configured to transfer the output image information, so as to input the output image information to the image forming and outputting unit, wherein the image forming and outputting unit is to apply the image forming and outputting process to the output image information; and
   a clock oscillator configured to generate first clocks to be supplied to the read image transfer circuit and second clocks to be supplied to the output image transfer circuit, wherein the clock oscillator is configured to individually alter a first clock supply state for supplying the first clocks to the read image transfer circuit and a second clock supply state for supplying the second clocks to the output image transfer circuit, depending on an operating mode of the image processing apparatus.

2. The image processing apparatus according to claim 1, wherein the clock oscillator is configured to individually alter the first clock supply state for supplying the first clocks to the read image transfer circuit and the second clock supply state for supplying the second clocks to the output image transfer circuit, depending on the control of the controller.

3. The image processing apparatus according to claim 1, wherein, when the operating mode of the image processing apparatus is such that only one of the read image transfer circuit and the output image transfer circuit operates, the clock oscillator is configured to supply a corresponding one of the first clocks and the second clocks to the operating one of the read image transfer circuit and the output image transfer circuit, and configured to regulate supply of the other one of the first clocks and the second clocks to the other one of the read image transfer circuit and the output image transfer circuit.

4. The image processing apparatus according to claim 3, wherein the clock oscillator includes, corresponding to the read image transfer circuit, a first multiplier circuit configured to generate first high-speed clocks by multiplying clocks supplied from an external device, a first clock division circuit configured to generate first low-speed clocks by dividing the multiplied clocks, and a first selector circuit configured to receive the first high-speed clocks and the first low-speed clocks, and configured to output one of the first high-speed clocks and the first low-speed clocks, wherein the clock oscillator includes, corresponding to the output image transfer circuit, a second multiplier circuit configured to generate second high-speed clocks by multiplying the clock supplied from the external device, a second clock division circuit configured to generate second low-speed clocks by dividing the multiplied clocks, and a second selector circuit configured to receive the second high-speed clocks and the second low-speed clocks, and configured to output one of the second high-speed clocks and the second low-speed clocks, and wherein the clock oscillator is configured to output a corresponding one of the first high-speed clocks and the second high-speed clocks to be supplied to the operating one of the read image transfer circuit and the output image transfer circuit, and configured to output a corresponding one of the first low-speed clocks and the second low-speed clocks to be supplied to the other one of the read image transfer circuit and the output image transfer circuit.

5. The image processing apparatus according to claim 1, wherein, when the operating mode of the image processing apparatus is such that only one of the read image transfer circuit and the output image transfer circuit operates, the clock oscillator is configured to supply a corresponding one of the first clocks and the second clocks to the operating one of the read image transfer circuit and the output image transfer circuit, and configured to terminate supply of the other one of the first clocks and the second clocks to the other one of the read image transfer circuit and the output image transfer circuit.

6. The image processing apparatus according to claim 5, wherein the clock oscillator includes, corresponding to the read image transfer circuit, a first multiplier circuit configured to generate first high-speed clocks by multiplying clocks supplied from an external device, a first clock division circuit configured to generate first low-speed clocks by dividing the multiplied clocks, and a first selector circuit configured to receive the first high-speed clocks and the first low-speed clocks, and configured to output one of the first high-speed clock and the first low-speed clock, wherein the clock oscillator includes, corresponding to the output image transfer circuit, a second multiplier circuit configured to generate second high-speed clocks by multiplying the clock supplied from the external device, a second clock division circuit configured to generate second low-speed clocks by dividing the multiplied clocks, and a second selector circuit configured to receive the second high-speed clocks and the second low-speed clocks, and configured to output one of the second high-speed clocks and the second low-speed clocks, and wherein the clock oscillator is configured to output a corresponding one of the first high-speed clocks and the second high-speed clocks to be supplied to the operating one of the read image transfer circuit and the output image transfer circuit, and configured not to supply any clocks to the other one of the read image transfer circuit and the output image transfer circuit by causing a corresponding one of the first multiplier circuit and the second multiplier circuit to terminate outputting the corresponding one of the first high-speed clocks and the second high-speed clocks.

7. An image processing circuit for an image processing apparatus including a reading unit configured to read a document and an image forming and outputting unit configured to perform an image forming and outputting process, the image processing circuit being configured to connect the reading unit and the image forming and outputting unit to a controller of the image processing apparatus, the image processing circuit comprising:

a read image transfer circuit configured to process read image information that has been read and generated by the reading unit and configured to transfer the read image information, so as to input the read image information to the controller;

an output image transfer circuit configured to process output image information that has been transferred from the controller and configured to transfer the output image information, so as to input the output image information to the image forming and outputting unit, wherein the image forming and outputting unit is to apply the image forming and outputting process to the output image information; and a clock oscillator configured to generate first clocks to be supplied to the read image transfer circuit and second clocks to be supplied to the output image transfer circuit, wherein the clock oscillator is configured to individually alter a first clock supply state for supplying the first clocks to the read image transfer circuit and a second clock supply state for supplying the second clocks to the output image transfer circuit, depending on an operating mode of the image processing apparatus.

8. A method of controlling an image processing apparatus including a reading unit configured to read a document and an image forming and outputting unit configured to perform an image forming and outputting process, wherein the image processing apparatus includes a read image transfer circuit configured to process read image information that has been read and generated by the reading unit and configured to transfer the read image information, so as to input the read image information to a controller of the image processing apparatus;

an output image transfer circuit configured to process output image information that has been transferred from the controller and configured to transfer the output image information, so as to input the output image information to the image forming and outputting unit, wherein the image forming and outputting unit is to apply the image forming and outputting process to the output image information; and a clock oscillator configured to generate first clocks to be supplied to the read image transfer circuit and second clocks to be supplied to the output image transfer circuit, wherein the method of controlling the image processing apparatus comprises:

a step of detecting a change in an operating mode of the image processing apparatus; and a step of individually altering a first clock supply state for supplying the first clocks to the read image transfer circuit and a second clock supply state for supplying the second clocks to the output image transfer circuit, depending on the detected operating mode of the image processing apparatus.

* * * * *